Figure 1:
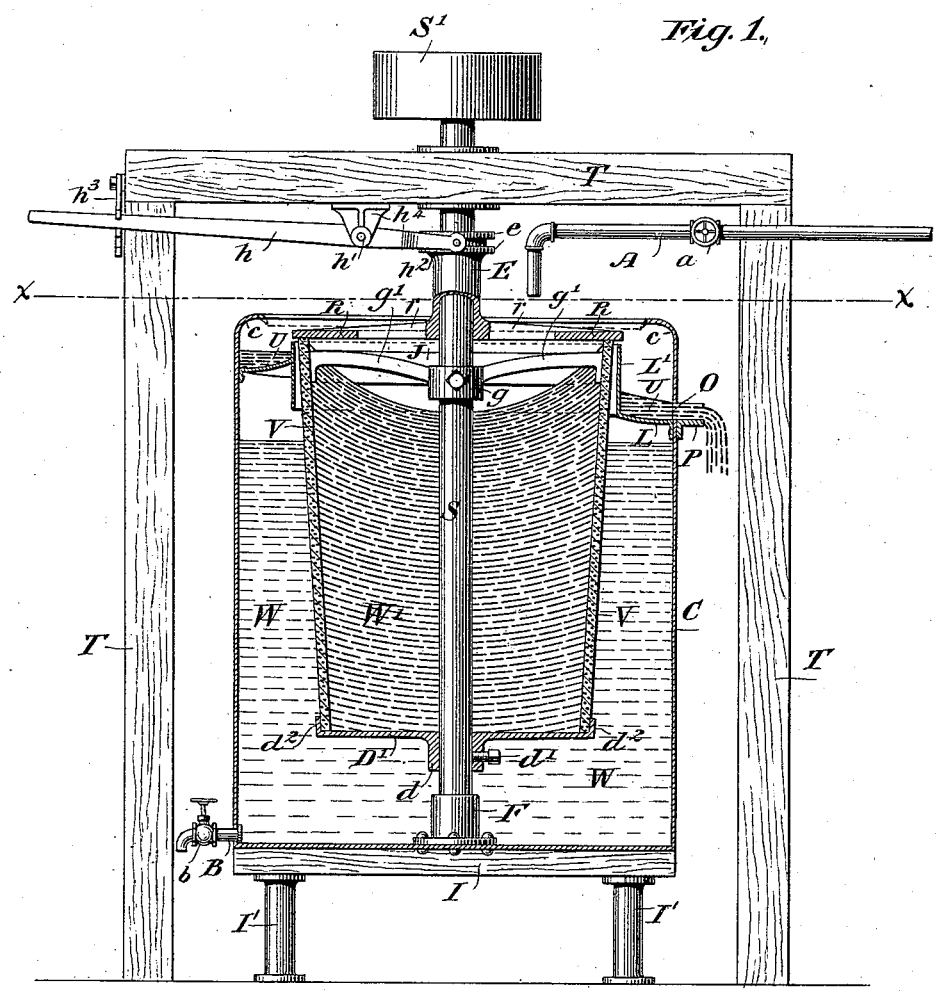

(No Model.)

D. WILLIAMSON.
CENTRIFUGAL FILTERING APPARATUS.

No. 468,858. Patented Feb. 16, 1892.

Witnesses
C. E. Ashley
Sam'l. Macpeak

Inventor
David Williamson
By his Attorney
Willard Parker Butler

UNITED STATES PATENT OFFICE.

DAVID WILLIAMSON, OF NEW YORK, N. Y., ASSIGNOR OF ONE-HALF TO HENRY B. ANDERSON, OF SAME PLACE.

CENTRIFUGAL FILTERING APPARATUS.

SPECIFICATION forming part of Letters Patent No. 468,858, dated February 16, 1892.

Application filed July 3, 1891. Serial No. 398,344. (No model.)

*To all whom it may concern:*

Be it known that I, DAVID WILLIAMSON, a citizen of the United States, and a resident of the city, county, and State of New York, have invented a certain new and useful Improvement in Centrifugal Filtering Apparatus, of which the following is a specification.

This invention relates to an improvement in filters, and especially to that class of filters in which the filtration is effected through or by means of a porous surface or body, and more particularly to that class of filter in which the liquid to be filtered is forced through the porous surface or body by centrifugal force applied by any convenient means to the liquid to be treated.

In the various forms of filter heretofore in use, in which the filtration is effected by or through a porous surface or body, great difficulty is experienced after a certain time in maintaining the operation of the filter, owing to the fact that the porous surface or body becomes coated with the impurities and the efficiency of the filter proportionately diminished. In such cases the operation of filtration is ordinarily extremely slow and tedious, and in order to facilitate the same it is necessary to filter under pressure and thus greatly complicate the apparatus and greatly increase the expense. Now I have discovered that when the porous surface or body is made in the form of an open or closed receptacle, which is arranged to be rapidly rotated upon a vertical axis, and the liquid to be filtered is admitted directly to its interior, the centrifugal force of the current created by the rotation of the vessel will operate to force the liquid through the porous sides of the vessel and effect filtration, while at the same time the precipitate will be prevented by the rotary motion of the vessel from accumulating on its sides, and if the former be made open at the top and the sides slightly inclined the impurities separated out will flow automatically over the walls of the vessel as they accumulate and may be thus automatically removed. By arranging the apparatus in the form indicated not alone is it possible to produce the same effect as is produced by filtering under pressure so far as rapidity and efficiency of filtration is concerned, but also to effect more perfect regulation of the speed of the filtration with great simplicity of construction and consequent diminution of expense, for the reason that the speed of the apparatus and the consequent amount of centrifugal force exerted upon the filtering medium is much more easily varied from time to time than the conditions of pressure can be varied in a filtering apparatus which operates under pressure.

The application of this principle of a rotating body of liquid to filtration through a porous medium, which is the gist of the invention, will be best understood by reference to the accompanying drawings, forming a part of this specification, which show the general application of the principle in its simplest form, and in which—

Figure 2:
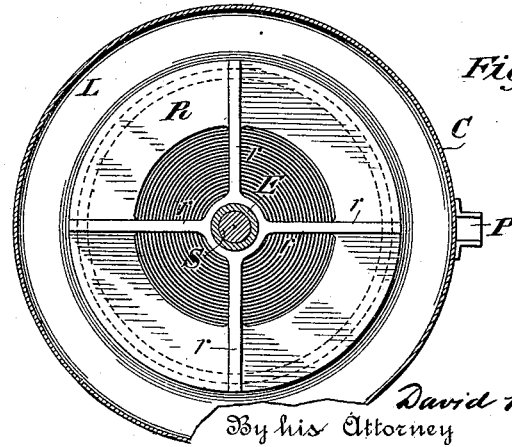

Figure 1 is a vertical section of an apparatus of the simplest form, and Fig. 2 is a horizontal section on the line $x\ x$ of Fig. 1.

Similar letters refer to similar parts throughout both views.

In the drawings, C represents a tank of any convenient shape, but preferably a cylindrical drum, as shown, constructed of sheet-iron and open on top. The upper edge $c\ c$ may be turned inward, as shown by the dotted line in Fig. 1, to prevent the ejection of the filtrate over the edge. The tank C is supported in any convenient manner, as by means of the floor I, resting upon the beams I' I'. Surrounding the tank is a frame of timber T, of convenient size and construction, arranged to support a vertically-rotating shaft S, surmounted by a driving-pulley S', which may be driven by a belt from a steam-engine or other convenient source of power which will give the necessary speed.

V is a porous vessel or cup, in the form of the frustum of a cone or cylinder open at the top, which is arranged within the tank C, as shown, and rests upon a circular bottom plate D', of sheet metal or other convenient material, which surrounds and is firmly attached to the shaft S at the point $d'$ by means of a hub $d$, which is attached to the shaft S by the screw $d'$, or in any other convenient manner. The shaft S terminates in and rotates at its base in a step-bearing F, placed on the bottom of the tank C, as shown, of convenient construction. The cup or vessel V is supported at the top by means of a ring R, fastened to its inner surface at the top and provided with radial spokes or arms $g'$ $g'$, terminating in a central collar or hub $g$, which surrounds the shaft S. For attaching the vessel V to the bottom plate D a cylindrical flange $d^2$ may be provided upon the periphery of the plate, as shown in Fig. 1.

E is a loose collar, which is arranged to slide vertically a certain distance on the shaft S above the hub $g$ and is provided with radial arms $r$, which support an annular disk or ring R, which is of such diameter at its outer circumference as to cover the periphery of the vessel V at its upper edge. By sliding the collar E vertically on the shaft S the ring R may be raised from the upper edge of the cup or vessel V to permit the discharge of the precipitate collected in the vessel from time to time. For the purpose of catching and removing the precipitate overflowing from the upper edge of the vessel or cup V a curved and inclined shelf L or ledge is provided on the inner surface of the drum D, as shown in Fig. 1. The highest point of the shelf L is nearly on a level with the upper edge of the vessel V, and from this point the shelf inclines gradually downward around the inner surface of the drum on either side of the highest point until the two surfaces of the shelf meet again at a point directly opposite to the highest point, at which point (which is consequently the lowest point in the inclination of the shelf) an opening O is provided in the cylindrical wall of the drum, through which the impurities can escape by means of a suitable spout or discharge-pipe P. It will be obvious from the construction of the shelf that all impurities or precipitate U flowing over the periphery of the cup V, no matter at what point, must flow downward on the shelf L and pass out through the opening O. To prevent the filtrate from flowing over the edge of the shelf a cylindrical guard or shield L' is provided at the edge of the shelf L, which guard is in such close proximity to the walls of the vessel V that any precipitate escaping over the upper edge of the vessel will flow downward over the edge of the guard L' and be caught upon the shelf L. At the same time the guard serves to separate the filtered water as it passes through the porous vessel V, which may be raised from time to time while the vessel is rotating to permit of the discharge of the precipitate from flowing over onto the shelf L and becoming fouled.

The object of the disk or ring R is to form a partial cover for the vessel V, and for the purpose of raising and lowering it on the shaft S a lever $h$ may be employed, provided with forked ends $h^2$, encircling the upper end of the collar E and engaging therewith through two shoulders $e$ $e$ formed thereon. The lever is pivoted to the frame T at the point $h'$, and a toothed rack $h^3$ is provided at the side of the frame to hold the loose end of the lever. By raising and lowering the loose end of the lever and engaging it with the toothed rack $h^3$ the ring R may be raised, lowered, or held at any given point at pleasure. The liquid to be filtered enters through the pipe A, controlled by a valve $a$, and is discharged through the pipe B, controlled by the valve $b$.

The operation of the apparatus is substantially as follows: The pulley S' having been first belted to the source of power, the motion of the motor will be transferred to the shaft S, and the shaft and the vessel V will be rotated. The liquid to be filtered is permitted to enter through the pipe A into the interior of the vessel V, and will at once begin to rotate rapidly. The effect of the rotation of the liquid will be to force the liquid through the porous walls of the rotating vessel V, leaving all the impurities contained in the liquid in vessel V, which impurities will gradually ascend along the surface of the cup, owing to the inclination of the side walls, and when the cover is raised overflow the upper edge of the same and collect as a precipitate U upon the shelf L, while the purified liquid, after passing through the porous walls of the cup V, will collect in the tank C, from which it may be drawn off from time to time through the pipe B as it accumulates.

It will be obvious that the mere details of the apparatus form no part of the real invention, and that the same may be modified from time to time, as may be found convenient, the gist of the invention consisting in the application of centrifugal force to filtering all classes of liquids through porous material.

I am aware that it is old to use centrifugal force for the purpose of keeping a movable body of filtering material in a vessel in such position that the body will always be of the same thickness, and a constant supply of liquid will be permitted to pass through the same; but I believe that it is new to apply centrifugal force for the purpose of forcing a liquid to pass through a permanent porous medium, and thereby produce the same effect as is produced by filtration therethrough under pressure, and at the same time diminish the cost of construction and facilitate the regulation of the apparatus.

I claim as my invention—

1. In a filtering apparatus, the combination, substantially as hereinbefore set forth, of a vessel having permanent and porous side walls rotating at a suitable speed, in which the liquid to be filtered is placed, and an exterior vessel for collecting the filtered liquid emerging therefrom.

2. In a filtering apparatus, the combination, substantially as hereinbefore set forth, of a vessel having permanent and porous inclined side walls rotating at a suitable speed, in which the liquid to be filtered is placed, an exterior vessel for collecting the filtered liquid emerging therefrom, and a shelf or trough in the interior of the exterior vessel for collecting and carrying off the precipitate thrown over the edges of the filtering-vessel.

3. In a filtering apparatus, the combination, substantially as hereinbefore set forth, of a tank for holding the filtered liquid, a vessel having permanent and porous inclined side walls rotating in said tank, in which the liquid to be filtered is placed, a shelf or trough on the inner surface of the tank for collecting and carrying off the overflow from the rotating vessel, and an annular and movable cover to the rotating vessel, substantially as described.

4. In a filtering apparatus, the combination, with the tank C and the rotating vessel having inclined side walls, of an inclined shelf or trough surrounding the inner surface of the tank, an opening in the wall of the tank at the point of lowest inclination of the shelf for the automatic discharge of the precipitate, and a protecting-edge to the shelf for preventing contact with the filtered liquid within the tank.

5. In a filtering apparatus, the combination, with the rotating vessel having inclined side walls, of an annular cover at its periphery arranged to be raised and lowered at pleasure and to thereby control the discharge of the material passing over the rim of the vessel.

In testimony that I claim the foregoing as my invention I have signed my name, in presence of two witnesses, this 2d day of July, 1891.

DAVID WILLIAMSON.

Witnesses:
GEORGE S. BIXBY,
WILLARD PARKER BUTLER.